Dec. 31, 1957  P. P. PHILLIPS  2,817,918
WATER-STABILIZED DECOY
Filed March 26, 1956
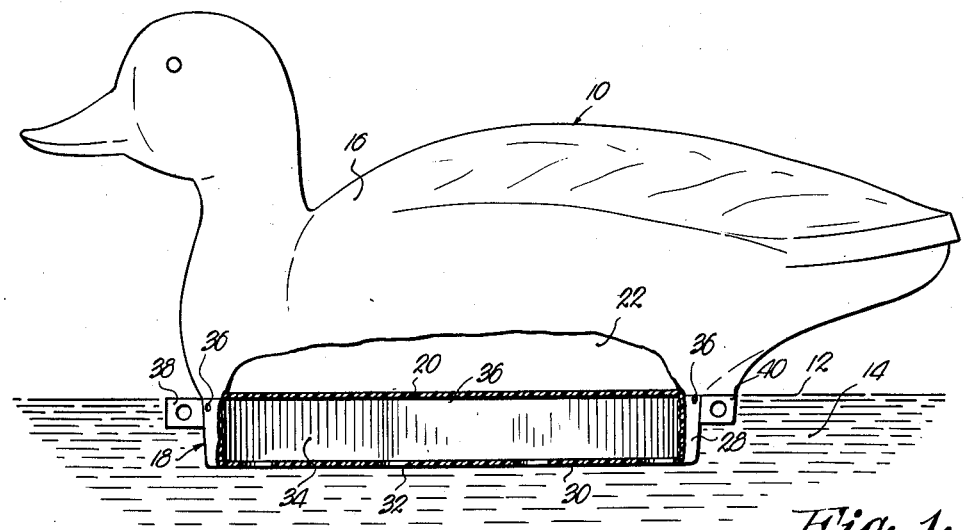
Fig. 1.
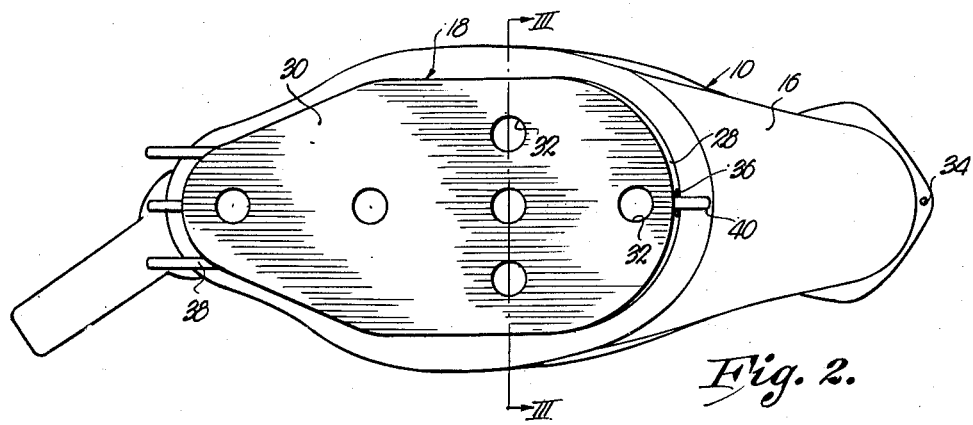
Fig. 2.
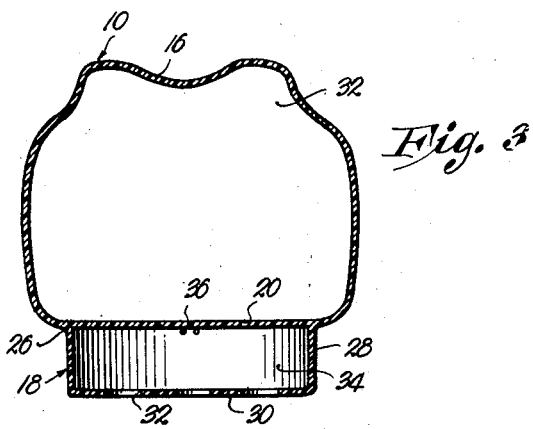
Fig. 3.
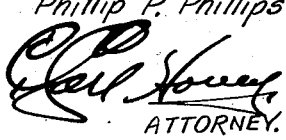
INVENTOR.
Phillip P. Phillips
BY
ATTORNEY.

United States Patent Office 2,817,918
Patented Dec. 31, 1957

2,817,918

WATER-STABILIZED DECOY

Phillip P. Phillips, Kansas City, Mo., assignor to Central Molding & Manufacturing Co., Kansas City, Mo., a corporation of Missouri Application March 26, 1956, Serial No. 573,676

1 Claim. (Cl. 43—3)

This invention relates to the field of sporting goods and, more particularly, to an improved type of decoy for use by hunters in attracting wild fowl to the vicinity of a body of water.

The primary object of the invention is to provide a wild fowl decoy of construction such that, besides resembling the wild fowl being simulated when viewed from above, it will ride upon the surface of a body of water in a natural, life-like manner closely approximating that in which a live fowl of the type in question would ride upon such body of water under similar conditions of wind and water movement.

It is another important object of this invention to provide such a decoy adapted to float upon a body of water and which includes structure for stabilizing the decoy by means of water ballast taken from the body of water upon which the decoy is used.

Another important object of this invention is to provide such a decoy in which the water ballast is taken on automatically as the decoy is placed upon the surface of the body of water and is automatically discharged when the decoy is lifted from the water.

Another important object of this invention is to provide such a decoy which will be light in weight and adapted for convenient storage and which is simple and foolproof in nature and may be manufactured without substantial addition to the usual cost of a decoy without such features.

Still other important objects of the invention, including certain important details of construction, will be made clear or become apparent as the following description of the invention progresses.

In the accompanying drawing:

Fig. 1 is a side elevational view of a decoy as contemplated by this invention in operative position upon the surface of a body of water, parts being broken away and shown in cross section for clarity of illustration;

Fig. 2 is a bottom plan view of the decoy shown in Fig. 1; and

Fig. 3 is a cross sectional view taken on line III—III of Fig. 2.

Referring now to the drawing, the numeral 10 generally designates an illustrative embodiment of the improved form of decoy floating upon the surface 12 of a body of water 14.

Decoy 10 includes an uppermost hollow body 16 having an external configuration resembling, as nearly as possible, the particular wild fowl with which the decoy 10 is to be used, and a lowermost ballasting assembly generally designated 18.

Body 16 is preferably formed of plastic material and includes a bottom wall 20, the body 16 being hollow and normally filled with air as at 22.

The assembly 18 is pan-like and of shape generally corresponding to the bottom wall 20 of body 16 to which it is attached. The pan-like assembly 18 is also preferably formed of the same plastic material as body 16 and is secured to the lowermost face of bottom wall 20 of body 16 as at 26 by any suitable plastic bonding technique, several of which are well known in the plastics art.

Assembly 18 includes a continuous side wall 28, the uppermost extremity of which is secured to the bottom wall 20 of body 16 and an integral bottom 30.

Bottom 30 is provided with a number of perforations 32 of substantial size through which water 14 may enter a ballast chamber 34 defined by the assembly 18 and bottom wall 20 of body 16 when the decoy 10 is placed upon the water surface 12, and by which water within chamber 34 may rapidly be discharged back into the body of water 14 when the decoy 10 is lifted from the surface 12. It is significant that perforations 32 should be provided adjacent each of the sides and the front and back of the bottom 30 of assembly 18.

In order that water 14 may immediately enter the chamber 34 through the perforations 32 when the decoy 10 is emplaced or thrown into position upon the surface 12, and in order to prevent the formation of any air pockets within the chamber 34, the side wall 28 is provided with one or more relatively small holes 36 at the front, back and each of the sides of the assembly 18 adjacent the uppermost extremity of the side wall 28 which is attached to the bottom wall 20 of body 16. Such holes 36 permit the escape of air from the chamber 34 as water enters through the perforations 32, and also permit the ingress of air to provide for displacement of water from the chamber 34 when the decoy 10 is removed from surface 12.

If desired, other conventional features may be added to the decoy, such as the tying brackets illustrated at 38 and 40.

It will now be manifest that the decoy contemplated by this invention is ideally adapted for the accomplishment of all of the above-mentioned and other objects and advantages of the invention. It will be equally evident, however, that certain minor modifications and changes could be made from the exact structure disclosed for purposes of illustration without departing from the true spirit and intention of the invention. Accordingly, it is understood that the invention should be deemed limited only by the scope of the appended claim.

Having thus described the invention, what is claimed as new and desired to be secured by Letters Patent is:

In a floatable, fowl decoy, a closed, hollow body having an internal chamber filled with air to render the body buoyant, said body being provided with a substantially flat bottom wall and having an external configuration above said bottom wall thereof simulating the appearance of a fowl to be decoyed; and a pan-like assembly attached to said bottom wall of the body presenting a second chamber beneath said bottom wall, said assembly having a continuous, substantially vertical side wall depending from the bottom wall of the body and a flat bottom provided with perforations therein for permitting ingress of water into the second chamber when the decoy is placed upon a body of water and egress of water from the second chamber when the decoy is lifted from the body of water, said side wall being provided with a pair of opposed, air escape holes therethrough adjacent the upper extremity of said second chamber, said holes being substantially smaller than said perforations, said bottom being below and in spaced parallelism with said bottom wall, the volume of said internal chamber of the body being substantially greater than the volume of said second chamber, and the vertical height of the body being substantially greater than the vertical height of the assembly.

References Cited in the file of this patent

UNITED STATES PATENTS 2,112,385 Smith _____ Mar. 29, 1938
2,546,189 Keep et al. _____ Mar. 27, 1951